United States Patent [19]

Hart

[11] 4,302,137

[45] Nov. 24, 1981

[54] ANTI-TAMPER FASTENING MEANS

[76] Inventor: Henry Hart, 86 Manor Rd., Chiswell, Essex, England

[21] Appl. No.: 954,528

[22] Filed: Oct. 25, 1978

[51] Int. Cl.³ .............................................. F16B 37/00
[52] U.S. Cl. ..................................... 411/432; 70/231; 411/910
[58] Field of Search ............................ 85/45, 32 R, 35; 70/231, 230, 229, 232, 259, 260; 411/432, 429, 910

[56] References Cited

U.S. PATENT DOCUMENTS

| | | | |
|---|---|---|---|
| 2,179,045 | 11/1939 | Lewis | 85/45 UX |
| 2,708,844 | 5/1955 | Cincel | 70/259 X |
| 2,978,896 | 4/1961 | Saccone | 70/231 |
| 3,492,841 | 2/1970 | Ipri | 70/231 |
| 4,125,051 | 11/1978 | Herkes et al. | 85/45 |

FOREIGN PATENT DOCUMENTS

| | | | |
|---|---|---|---|
| 881129 | 6/1953 | Fed. Rep. of Germany | 85/45 |
| 2033556 | 7/1971 | Fed. Rep. of Germany | 85/32 R |
| 1274286 | 5/1972 | Fed. Rep. of Germany | 70/259 |
| 633186 | 10/1927 | France | 85/35 |
| 952989 | 5/1949 | France | 70/259 |
| 1038363 | 5/1953 | France | 85/32 R |

Primary Examiner—Ramon S. Britts
Attorney, Agent, or Firm—Schwartz & Weinrieb

[57] ABSTRACT

The invention relates to fastening means of the known kind comprising a nut or bolthead and a spanner component, the nut or bolthead having a smooth edge surface and the spanner component having locating pins adapted to engage in cooperating bores in the nut or bolthead to rotate the nut or bolthead with the spanner component. Said fastening means are improved by providing (a) a sleeve which rotatably covers at least part of said edge surface and/or (b) an axial projection, preferably on the nut or bolthead, which is received as a rotatable fit in a recess, preferably in the spanner component, to restrict lateral movement between the nut or bolthead and the spanner component.

5 Claims, 7 Drawing Figures

ANTI-TAMPER FASTENING MEANS

FIELD OF THE INVENTION

The present invention relates to fastening means and has particular but not exclusive application to fastening means adapted to retain a wheel of a vehicle on its axle.

BACKGROUND OF THE INVENTION

It is known from, for example, my U.K. Patent Specification No. 1250110 to provide fastening means comprising a nut or bolthead and a spanner component, the nut or bolthead having a smooth edge surface and the spanner component having locating pins adapted to engage in co-operating bores in the nut or bolthead to rotate the nut or bolthead. Such fastening means are referred to hereinafter as "fastening means of the kind referred to". It will be appreciated that the smooth edge surface of the nut or bolthead makes it difficult, if not impossible, for the nut or bolthead to be rotated with conventional turning tools such as wrenches or conventional spanners. In order to reduce further the possibility of the nut or bolthead being gripped, it is preferred that the edge of the nut or bolthead should be an inclined or arcuate surface of revolution, especially frustoconical or domed shape, into which the said bores extend and the spanner component should be a cap having a recess to receive said edge and into which recess the locating pins project. Said preferred fastening means are commercially available under the trade mark "BARRINUT", in which product the positions of the locating pins and bores are coded so that a specific cap is required to rotate a specific nut or bolthead.

Fastening means of the kind referred to, especially "BARRINUTS" have been successfully employed for retaining wheels on private motor cars and light vans. However, they are not generally acceptable for use on lorries, coaches and other heavy goods and public service vehicles. A principal reason for said lack of acceptance has been the cost of producing such fastening means in a sufficiently heavy duty form to enable conventional tools, especially power wrenches, to be used to tighten the fastening means into a wheel-retaining position. In particular, if the locating pins are not properly located in their respective bores, they can readily be sheared by the torque applied by power wrenches. Accordingly, correct location of the spanner component, especially in the preferred recessed embodiment disclosed above, on the nut or bolthead is essential when using power wrenches. However, such location is not always achieved or maintained with fastening means of prior art design. Moreover, since many goods and public service vehicles do not have fully recessed hubs, as is usual on motor cars and light vans, the nut or bolthead is more accessible to wrenches and other tools and hence more susceptible to unauthorised removal.

OBJECT OF THE INVENTION

It is an object of this invention to provide fastening means of the kind referred to which is suitable for use on heavy goods and public service vehicles to securely retain wheels thereon.

SUMMARY OF THE INVENTION

According to a first aspect of the present invention, there is provided fastening means of the kind referred to in which the edge of the nut or bolthead is at least partially covered by a sleeve which is rotatable relative to said nut or bolthead. It will be appreciated that the presence of the sleeve will increase substantially the difficulty of obtaining a grip on the nut or bolthead. Further, it will also be appreciated that the sleeve can make it unnecessary to provide the previously preferred inclined or arcuate surface of revolution on the nut or bolthead and thereby obviate the attendant difficulties of drilling bores in such curved surfaces.

The sleeve preferably is mounted on the nut or bolthead although it can be otherwise mounted if desired, for example, by location of an inner annular flange of the sleeve about a threaded shank on which the nut is received or the shank bearing the bolthead. Conveniently, the sleeve is mounted on the nut or bolthead by one or more circlips engaging respective annular grooves in the sleeve.

The sleeve can be, for example, a right circular sleeve but it is preferred that its outer end (with respect to the threaded shank or bore to be engaged by the nut or bolt of the fastening means) at least partially covers the outer end of the nut or bolthead. Said outer end can have, for example a planar external surface or an external inclined or arcuate surface of revolution, for example, frustoconical or domed shape. The latter kind of external surface (that is, constituted by an inclined or arcuate surface of revolution) is particularly preferred when the nut or bolthead has an axial extension as described below in connection with a second aspect of this invention.

When the outer end of the sleeve at least partially covers the outer end of the nut or bolthead, it is preferred that it extends to a level inwardly of the bores in the nut or bolthead and that one or more gaps or holes are provided in the sleeve for alignment with said bores to permit the locating pins from the spanner component to pass through the sleeve into said bores.

As mentioned previously, the presence of the sleeve can make it unnecessary to provide an external inclined or arcuate surface of the revolution to the nut or bolthead. Thus the nut or bolthead can have, and in certain embodiments preferably has, a planar outer end into which the required bores are readily drilled.

In a presently preferred embodiment of the first aspect of the present invention, fastening means of the kind referred to includes a sleeve surrounding the edge of the nut or bolthead and rotatably mounted coaxially with respect to said nut or bolthead, said sleeve extending radially inwardly at its axially outer end to cover at least part of the outer end of the nut or bolthead and having one or more gaps or holes for alignment with the bores in the nut or bolthead to allow engagement of the locating pins of the spanner component in said bores.

In a second and less preferred embodiment of the present invention, fastening means of the kind referred to includes a sleeve surrounding the edge of the nut or bolthead and rotatably mounted coaxially with respect to said nut or bolthead, said sleeve protruding axially outwardly beyond the nut or bolthead and being adapted to accommodate from its axially outer end sufficient of the spanner component to enable the locating pins of said component to engage the bores in said nut or bolthead.

According, to a second aspect of the present invention, there is provided fastening means of the kind referred to wherein one of the nut or bolthead and the spanner component has a co-axially extending projection spaced radially inwardly of the bores and pins respectively and the other of the nut or bolthead and the spanner component has a co-axial recess complementary to said projection whereby relative lateral movement between the nut or bolthead and the spanner component is substantially prevented. It will be appreciated that engagement of the projection in the complementary recess facilitates proper engagement of the locating pins in their respective bores and substantially reduces the risk of disengagement during operation of the spanner component.

Conveniently, the projection is provided on the nut or bolthead and the recess is provided in the spanner component, in which case the said recess is suitably a bore through the said component.

Usually, the projection will be cylindrical permitting of rotation of the spanner component relative to the nut or bolthead to align the locating pins with their respective bores. However, other shaped projections can be employed, in which case it will be necessary to correlate the shape of the projections with the positions of the locating pins and bores.

It is preferred that fastening means of this invention have in combination the features of the first and second aspects described above.

It is especially preferred that the fastening means of this invention is adapted to secure a wheel to a vehicle, particularly a motor vehicle.

BRIEF DESCRIPTION OF THE DRAWING

The following is a description by way of example only and with reference to the accompanying drawings of two embodiments of the present invention. In the drawings:

FIG. 4 is a cross-sectional view through the fastening means of FIG. 2 when assembled;

DETAILED DESCRIPTION OF THE ILLUSTRATED EMBODIMENTS

Figure 1:
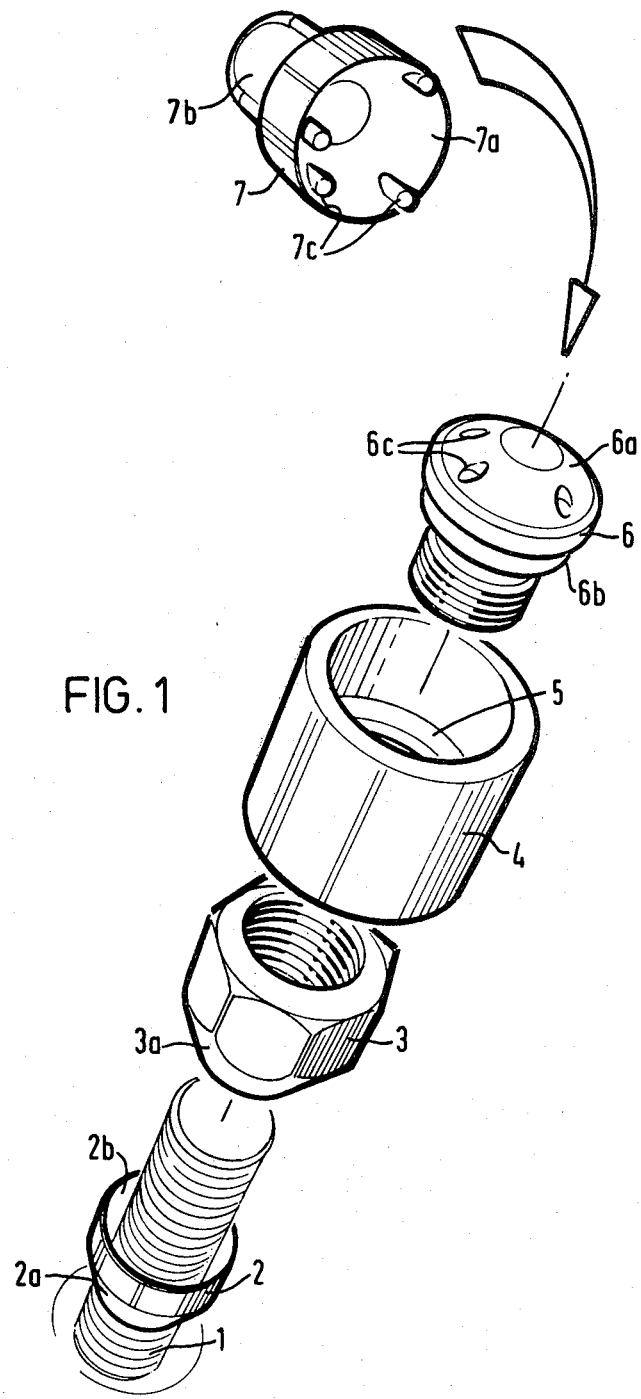
FIG. 1 is an exploded perspective view of fastening means for a vehicle wheel in accordance with the less preferred of said two embodiments.

Referring first to FIG. 1, fastening means for a vehicle wheel comprises a threaded wheel stud 1 which extends from a vehicle hub (not shown) to be slidably received through a hole in a vehicle wheel (not shown). A collar 2 is slidably received on the stud 1 and has a frusto-conical external surface 2a at its axially inner end (with respect to the stud) complementary to a counterbore portion in the vehicle wheel. The collar 2 also has a frusto-conical internal surface 2b at its axially outer end to receive as a contact fit therein the axially inner end 3a of a nut 3 originally intended to directly retain the wheel on the stud 1. The respective axial lengths of the collar 2 and nut 3 are such that, when the wheel is retained on the stud 1 by tightening the nut 3 against collar 2, nut 3 protrudes axially beyond the end of stud 1.

A right cylindrical sleeve 4 has an internal diameter sufficient to receive nut 3 as a rotatable fit therein. An annular projection 5 extends radially inwardly in the centre of the sleeve to limit relative axial movement between the sleeve 3 and nut 3. The relative axial lengths of the sleeve 5 and nut 5 are such that when the nut abuts the axially inner surface of projection 5 substantially all of the hexagonal portion of the nut is enclosed within the sleeve.

A bolt 6 has a threaded shank adapted to be threadably received in the projecting end of the nut 3. This bolt 6 has a domed head 6a separated from the threaded shank by a stepped portion 6b providing an axially inner shoulder to abut the axially outer surface of the nut 3 and an axially outer shoulder to abut the axially outer surface of projection 5. The axial distance between the two shoulders is slightly larger than the axial width of projection 5 whereby when the bolt 6 is tightened onto nut 3 the sleeve 4 is rotatable about said nut and bolt. The relative axial lengths of sleeve 4 and bolt 6 are such that when tightened against the nut, the bolt 6 is totally recessed within the sleeve 4. The domed head 6a has four circumferentially spaced recesses 6c to receive correspondingly positioned pins 7c extending from a recess 7a in a socket member 7. The surface of recess 7a is complementary to that of domed head 6a. The axially outer end 7b of the socket member 7 is hexagonally shaped to enable the member to be gripped by a box spanner to permit tightening of the bolt 6.

In use, the wheel is firmly held against the hub by tightening the nut 3 on stud 1 to sandwich the collar 2 between the wheel and the nut. Conventional tools such as a wheel brace or power wrench can be used to tighten the nut 3. The sleeve 4 is then located over the nut 3 and the bolt 6 screwed into the end of the nut until the axially inner surface abuts the axially outer surface of the nut. The bolt 6 is screwed by means of socket 7 which is in turn rotated by, for example, a box spanner. The bolt 6 thereby retains sleeve 4 in a position where nut 3 cannot be gripped by conventional tools and, since the sleeve is rotatable about the nut, rotation of the sleeve does not move the nut. The nut is therefore effectively locked onto the stud 1 and can only be released using the socket member 7. By coding the positions of the pins 7c and recesses 6c individual locking means can be provided for each fastening means.

Figure 2:
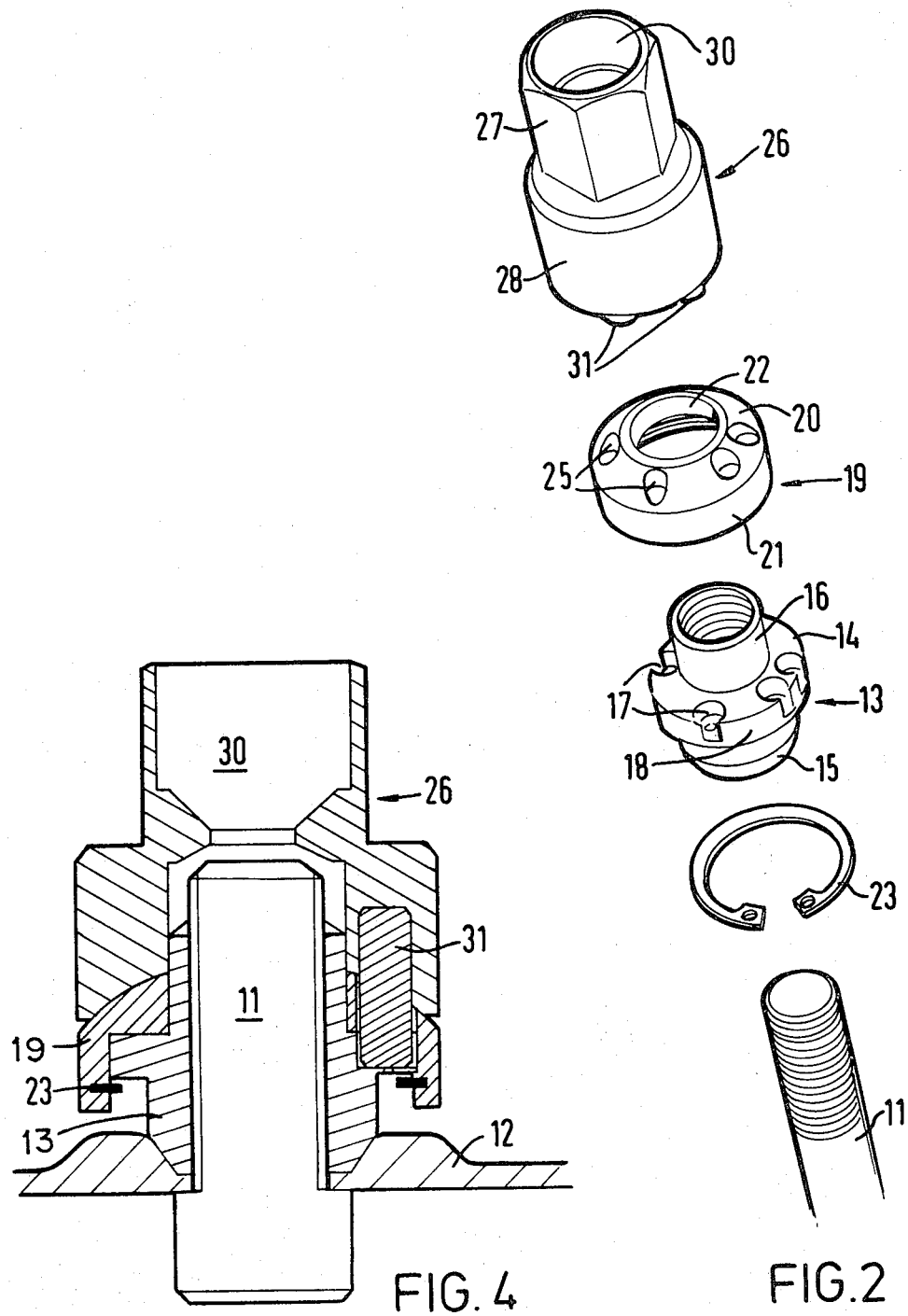
FIG. 2 is an exploded perspective view corresponding to FIG. 1 of fastening means for a vehicle wheel in accordance with the preferred of said two embodiments.
Figure 3:
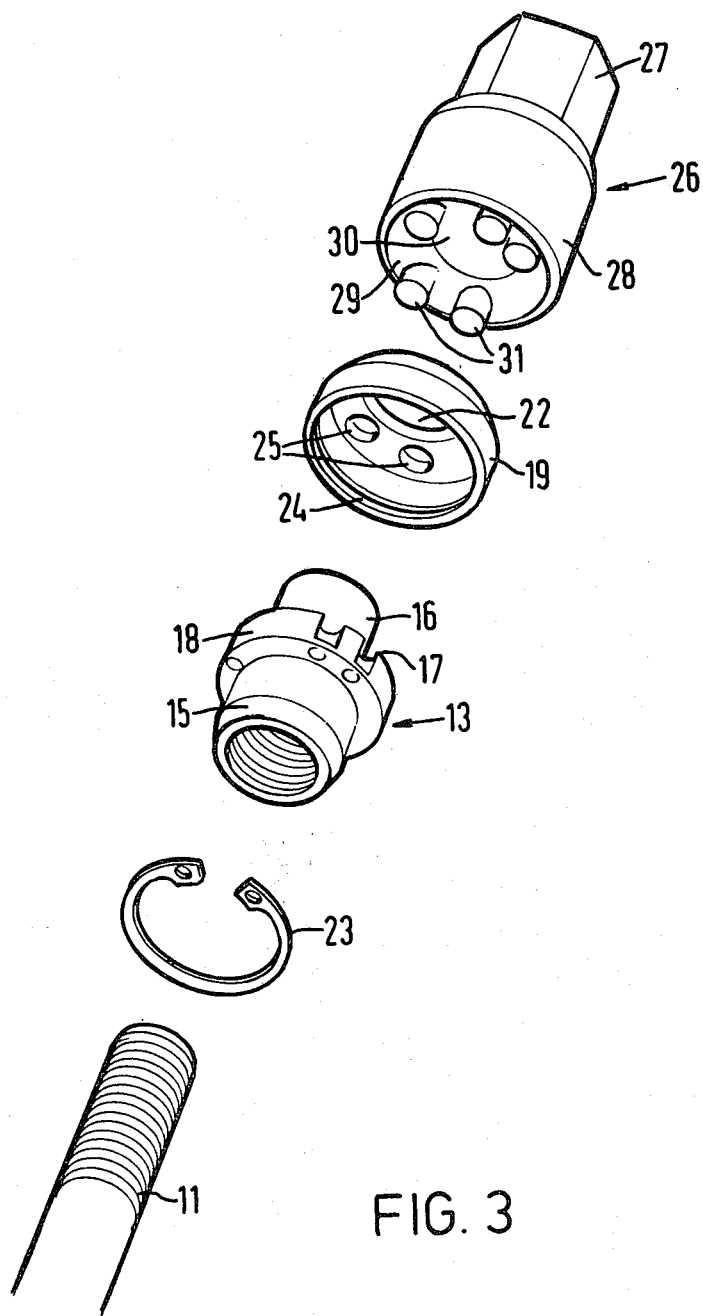
FIG. 3 is an exploded view from below of the fastening means of FIG. 2.

Referring now to FIGS. 2 and 4, fastening means in accordance with a preferred embodiment of the invention comprises a threaded wheel stud 11 which protrudes from a vehicle hub (not shown) to be slidably received through a countersunk hole in a vehicle wheel 12. A nut 13 comprises a threaded sleeve adapted to be threadably received on the stud 11 and having a radially extending annular flange 14. The sleeve portion 15 below the flange 14 is of greater diameter than the sleeve portion 16 above the flange 14. The free end of sleeve portion 15 is frustoconically tapered a complementary manner to the counterbore portion in the vehicle wheel. The upper and lower surfaces of the flange 14 are planar and a number of circumferentially-spaced bores 17 are drilled into the flange 14 from its upper surface. As shown in FIGS. 2 and 3, the bores can be at the edge of the flange to open into the side wall 18 thereof. A sleeve 19 is provided to rotatably surround the edge 18 of flange 14. The sleeve 19 has a domed top 20 from the lower end of which a skirt portion 21 depends. A bore 22 extends co-axially through the domed portion 20 to receive sleeve portion 16 of nut 13 as a sliding and rotatable fit therein. The dimensions of the sleeve 19 are such that when placed on nut 13 with the upper surface of flange 14 in contact with the base of domed portion 20, the skirt 21 extends below the side wall 18. The sleeve 19 is retained on nut 13 by a circlip 23 which engages in a groove 24 extending circumferentially in the inner surface of skirt 21 below flange 14. The circlip 23 limits axially upward movement of the sleeve 19 relative to the nut 13 by abutment with the lower face of flange 14. It will be appreciated that the circlip 23 is only readily accessible when nut 13 is removed from stud 11. A plurality of bores 25 are formed through the domed top 20 of the sleeve 19 in a relative disposition corresponding with that of bores 17 in nut 13. Thus, holes 25 can be aligned with respective bores 17.

A spanner component 26 is provided to rotate the nut 13 on the stud 11. The component 26 has an hexagonally shaped axially outer end 27 to enable it to be gripped by a box or other spanner to permit rotation. The axially inner part 28 has a cylindrical outer surface and a domed recess 29 extends therein complementary to the domed top 20 of the sleeve 19. A central bore 30 extends through the component 26 and is enlarged to different diameters at its upper and lower ends as shown in FIG. 4. The lower end of bore 30 receives sleeve portion 16 as an axially sliding and rotatable fit therein. Pins 31 protrude from the recess 29 to pass through holes 25 into bores 17 when the component 26 receives sleeve portion 16 in the lower end of bore 30 and domed top 20 in the recess 29.

In use, the wheel 12 is firmly held against the hub, by tightening nut 13 onto the stud 11 using spanner component 26. Lateral movement of the spanner component 26 relative to the nut 13 is substantially prevented by engagement of sleeve portion 16 in bore 30. In the absence of the spanner component 26, the nut 13 cannot readily be unscrewed from the stud 11. In particular, the edge 18 of nut 13 is shrouded by skirt 21 of sleeve 19, which is rotatable relative to the nut 13.

Figure 7:
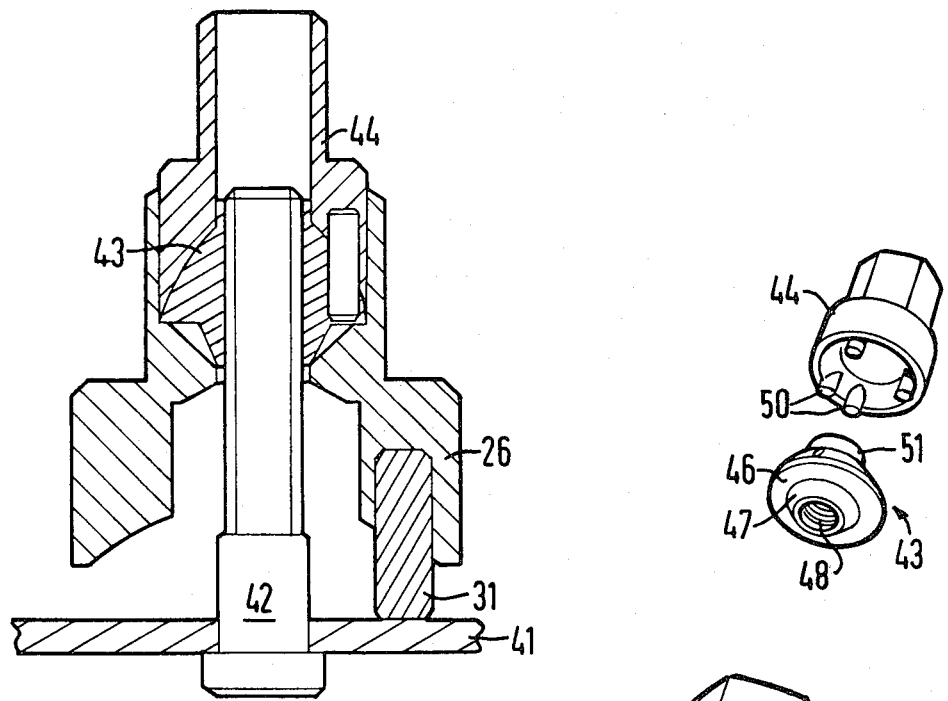
FIG. 7 is a cross-sectional view through the assemblage of FIG. 5 when assembled.
Figure 5:
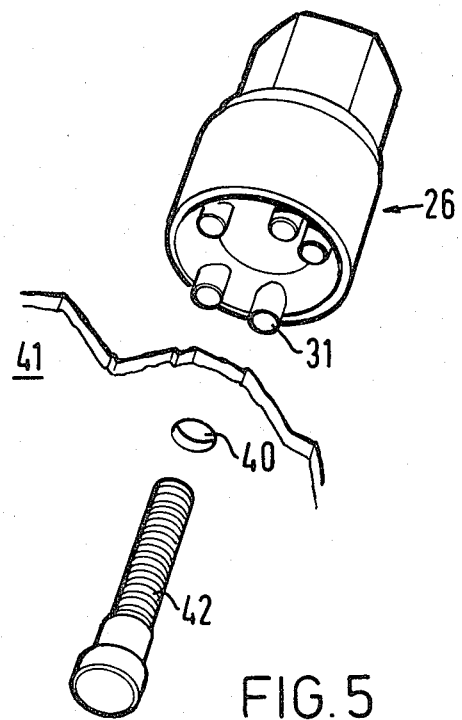
FIG. 5 is an exploded view of an assemblage consisting of the spanner component of the fastening means of FIG. 2 and means for securing said component to a vehicle for storage.
Figure 6:
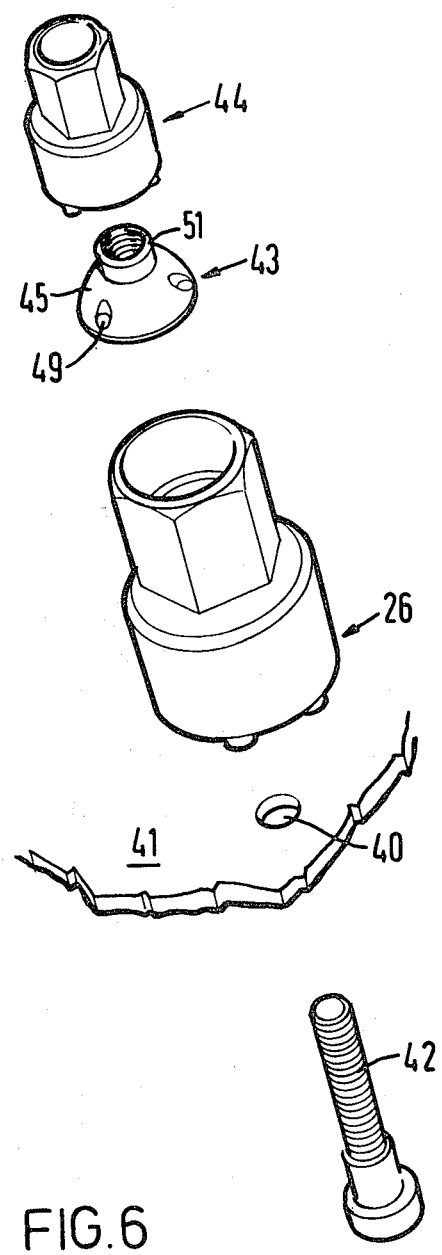
FIG. 6 is an exploded view from above of the assemblage of FIG. 5.

If the fastening means of FIGS. 2 to 4 are made for heavy duty use, such as locating a wheel on a heavy goods or public service vehicle, the spanner component 26 will often be too heavy and/or large to be conveniently carried on the person of the driver of the vehicle. Accordingly, there is shown in FIGS. 5 to 7 a means of securely mounting the spanner component 26 on the vehicle itself. A hole 40 is provided in a plate 41 constituting a relatively accessible part of the vehicle bodywork. A bolt 42 is provided to extend through the hole 40 and into the enlarged outer end of the bore 30 of component 26 when the pins 31 of the component rest against the plate 41. The component 26 is secured in said position by an assembly consisting of a domed nut 43 and a spanner component 44 which is smaller and lighter than component 26 and therefore can be readily carried on the person of a driver of the vehicle. The nut 43 has a frustoconical upper surface 45, a planar annular shoulder portion 46 and a co-axially dependent frustoconical lower portion 47. A central threaded bore 48 extends through the nut 43. Axially-extending blind bores 49 extend into the frustoconical portion to receive co-operating pins 50 of the spanner component 44. The spanner component 44 is of substantially the same construction as component 7 shown in FIG. 1. The nut 43 also has a cylindrical co-axial projection 51 which is received as a rotatable fit in the bore of the spanner component 44.

It will be appreciated that the invention is not restricted to the details particularly described above with reference to the drawings but that numerous modifications and variations can be made without departing from the scope of the invention. For example, the top of sleeve 19 could be a planar annulus and the recess 29 could be cylindrical or even omitted, in which latter case the pins would directly protrude from an annular base of the spanner component 26.

I claim:
1. Fastening means comprising:
a spanner component;
locating pins disposed on said spanner component;
a threaded fastening element selected from nuts and headed bolts having a smooth edge surface defined about the periphery thereof so as to prevent the rotation thereof with conventional tools; and
bores defined within said threaded fastening element for engagement by said pins of said spanner component so as to facilitate the rotation of said fastening element by said spanner component, the improvement comprising in combination:
(a) said fastening element comprising a first body and a second body threadedly engageable together in the axial direction and including coaxial step means axially interposed between portions of said fastening element of greater diameter; and
(b) a sleeve having a radially inward annular projection axially interposed between its ends, the axial length of said annular projection being less than the axial length of said fastening element step means so as to render said sleeve freely rotatable about said fastening element with said annular projection disposed about said step means, said annular projection abutting said fastening element portions of greater diameter so as to secure said sleeve against axial removal from said fastening element, a first end portion of said sleeve at least partially covering one of said first and second bodies of said fastening element, and a second end portion of said sleeve extending axially beyond the second one of said bodies of said fastening element so as to receive said spanner component in a recessed manner.

2. Fastening means comprising:
a spanner component;
locating pins disposed upon said spanner component;
a threaded fastening element selected from nuts and headed bolts having a smooth edge surface defined about the periphery thereof so as to prevent the rotation thereof with conventional tools; and
bores defined within said fastening element for engagement by said pins of said spanner component so as to facilitate the rotation of said fastening element by said spanner conponent, the improvement comprising in combination:
(a) said fastening element comprises a radially outwardly projecting flange disposed intermediate its axial ends, and wherein said bores are defined within said flange;
(b) a sleeve rotatably mounted coaxially upon said fastening element and at least partially covering said smooth edge surface of said fastening element, said sleeve comprising a first portion extending axially beyond said flange; and a second portion extending radially inwardly from said first portion and at least partially overlying said bores of said flange, said second sleeve portion having defined therein apertures for alignment with said bores of said fastening element so as to facilitate engagement of said locating pins of said spanner component within said bores of said fastening element;

(c) retainer means removably mounted upon said first sleeve portion at a position axially beyond said flange of said fastening element and projecting radially inwardly from said first sleeve portion for removably retaining said sleeve upon said fastening element; and (d) tool-engaging means defined upon said retainer means for facilitating removal of said retainer means from said first sleeve portion, and means defined between said first sleeve portion and said fastening element for providing access to said tool-engaging means.

3. The fastening means as set forth in claim 2, wherein:
said retainer means comprises a circlip disposed within an annular groove defined within said first sleeve portion.

4. The fastening means as set forth in claim 2, wherein:
the axially outer end of said sleeve has an external surface selected from inclined surfaces of revolution and arcuate surfaces of revolution.

5. The fastening means as set forth in claim 2, wherein:
a projection extends coaxially from one of said spanner component and said threaded fastener element and is spaced radially inwardly of said bores and pins, respectively; and
recess means is defined coaxially within said other one of said spanner component and said threaded fastener element for receiving said projection as a rotatable fit therein whereby lateral movement between said threaded fastening element and said spanner component is substantially prevented.

* * * * *